(12) United States Patent
Fischer et al.

(10) Patent No.: US 11,125,189 B2
(45) Date of Patent: Sep. 21, 2021

(54) INTERNAL COMBUSTION ENGINE FOR A MOTOR VEHICLE, AND METHOD FOR OPERATING SUCH AN INTERNAL COMBUSTION ENGINE

(71) Applicant: Bayerische Motoren Werke Aktiengesellschaft, Munich (DE)

(72) Inventors: Philipp Fischer, Otterfing (DE); Wolfgang Kern, Munich (DE); Michael Sallmann, Munich (DE); Martin Schenk, Rosenheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/048,405

(22) PCT Filed: May 8, 2019

(86) PCT No.: PCT/EP2019/061852
§ 371 (c)(1),
(2) Date: Oct. 16, 2020

(87) PCT Pub. No.: WO2019/224008
PCT Pub. Date: Nov. 28, 2019

(65) Prior Publication Data
US 2021/0164420 A1    Jun. 3, 2021

(30) Foreign Application Priority Data
May 22, 2018   (DE) .................... 10 2018 208 000.3

(51) Int. Cl.
*F02M 25/022*   (2006.01)
*F02B 37/00*   (2006.01)

(52) U.S. Cl.
CPC ......... *F02M 25/0227* (2013.01); *F02B 37/00* (2013.01); *F02M 25/0228* (2013.01)

(58) Field of Classification Search
CPC . F02M 25/0228; F02M 37/00; F02M 25/0227
See application file for complete search history.

(56) References Cited

U.S. PATENT DOCUMENTS

| 2007/0119414 A1 | 5/2007 | Leone et al. |
| 2007/0215069 A1* | 9/2007 | Leone .................. F02D 19/084 123/1 A |
| 2012/0180741 A1 | 7/2012 | Strey et al. |

FOREIGN PATENT DOCUMENTS

| DE | 10 2006 056 574 A1 | 5/2007 |
| DE | 10 2009 048 223 A1 | 6/2011 |

(Continued)

OTHER PUBLICATIONS

International Search Report (PCT/ISA/210) issued in PCT Application No. PCT/EP2019/061852 dated Aug. 9, 2019 with English translation (four (4) pages).

(Continued)

*Primary Examiner* — Kevin A Lathers
(74) *Attorney, Agent, or Firm* — Crowell & Moring LLP (57) ABSTRACT

An internal combustion engine has a combustion chamber, an intake tract through which air can flow, a first tank for a liquid spark-ignition fuel, a second tank for water, a mixing region, in which the spark-ignition fuel from the first tank is to be mixed with the water from the second tank thereby creating a mixture having the spark-ignition fuel and the water, an injection valve which is allocated to the combustion chamber and by which the mixture can be injected directly into the combustion chamber, and a second injection valve which is allocated to the combustion chamber and provided in addition to the injection valve and by which in relation to the water and the spark-injection fuel, only the spark-injection fuel from the first tank can be injected at a (Continued)

location upstream of the combustion chamber into the intake tract and thus into the air flowing through the intake tract.

10 Claims, 1 Drawing Sheet

(56) References Cited

FOREIGN PATENT DOCUMENTS

| | | |
|---|---|---|
| DE | 10 2013 206 102 A1 | 10/2014 |
| DE | 10 2016 003 126 A1 | 11/2016 |

OTHER PUBLICATIONS

German-language Written Opinion (PCT/ISA/237) issued in PCT Application No. PCT/EP2019/061852 dated Aug. 9, 2019 (five (5) pages).
German-language Office Action issued in German Application No. 10 2018 208 000.3 dated Apr. 10, 2019 (seven (7) pages).

\* cited by examiner

INTERNAL COMBUSTION ENGINE FOR A MOTOR VEHICLE, AND METHOD FOR OPERATING SUCH AN INTERNAL COMBUSTION ENGINE

BACKGROUND AND SUMMARY OF THE INVENTION

The invention relates to an internal combustion engine for a motor vehicle, in particular for a motor car, as well as to a method for operating the internal combustion engine for a motor vehicle.

An internal combustion engine for a motor vehicle, and a method for operating an internal combustion engine, are already known for example from DE 10 2006 056 574 A1. The internal combustion engine has at least one combustion chamber formed, for example, as a cylinder, and an intake tract which can be flowed through at least by air and by means of which the air flowing through the intake tract is to be conducted or is conducted to and, in particular into, the combustion chamber. The internal combustion engine furthermore has a first tank for accommodating liquid fuel by means of which the internal combustion engine is operable during the fired operation thereof. This means that the fuel can, in the combustion chamber, form a fuel-air mixture with the air, which mixture can be burned. The internal combustion engine furthermore has a second tank for accommodating water. Furthermore, a mixing region is provided in which, to form a mixture which has the gasoline from the first tank and the water from the second tank, the gasoline from the first tank is to be mixed or is mixed with the water from the second tank. Furthermore, the internal combustion engine comprises an injection valve which is assigned to the combustion chamber and by means of which the mixture is injectable or injected directly into the combustion chamber. In particular, the mixture may be an emulsion of the gasoline from the first tank and the water from the second tank.

Furthermore, DE 10 2009 048 223 A1 discloses a method for operating an internal combustion engine or a nozzle, in which method a fuel mixture is produced in situ. The fuel mixture is composed of a polar component A, a nonpolar fuel component B and an amphiphilic component C and also an auxiliary component D, and is produced in a high-pressure region of an injection system of the internal combustion engine or of the nozzle, specifically no earlier than ten seconds prior to an injection process, wherein a pressure lies in the range from 100 to 4000 bar.

It is an object of the present invention to further develop an internal combustion engine and a method of the type stated in the introduction such that operation with particularly low fuel consumption can be realized.

A first aspect of the invention relates to an internal combustion engine for a motor vehicle, in particular for a motor car designed for example as a passenger motor car. The internal combustion engine has at least one combustion chamber, designed for example as a cylinder, and an intake tract through which air can flow and by means of which the air flowing through the intake tract is to be conducted or is conducted into the combustion chamber. Furthermore, the internal combustion engine has a first tank for accommodating liquid fuel by means of which the internal combustion engine is operable during the fired operation thereof. The fuel is also referred to herein as petrol or motor gasoline, and is preferably a motor gasoline conforming to DIN EN 228. At least during the fired operation of the internal combustion engine, the gasoline, also referred to as petrol, forms an air-fuel mixture with the air in the combustion chamber, which mixture is burned. This results in exhaust gas of the internal combustion engine. The internal combustion engine is designed for example as a spark-ignition internal combustion engine, in particular as a gasoline engine, such that the fuel-air mixture in the combustion chamber is ignited by applied ignition and is consequently burned.

The internal combustion engine furthermore has a second tank, which is provided in addition to the first tank and which is for example separate from the first tank, for accommodating in particular liquid water. Furthermore, a mixing region is provided in which, to form a mixture which has liquid gasoline from the first tank and liquid water from the second tank, the gasoline in the first tank is to be mixed or is mixed with the water from the second tank. Furthermore, the internal combustion engine has an injection valve which is assigned to the combustion chamber and by means of which the mixture is injectable or injected directly into the combustion chamber. In order that, below, the injection valve by means of which the mixture is injectable directly into the combustion chamber can be clearly distinguished in terms of terminology from other parts and components of the internal combustion engine, the injection valve by means of which the mixture is injectable directly into the combustion chamber will also be referred to as first injection valve.

According to the invention, in order to now be able to realize operation of the internal combustion engine with particularly low fuel consumption and low pollutant emissions, a second injection valve is provided which is assigned to the combustion chamber and which is provided in addition to the first injection valve and by means of which, with regard to the water and the gasoline, exclusively the gasoline from the first tank is injectable, at a location arranged upstream of the combustion chamber in the flow direction of the air flowing through the intake tract, into the intake tract and thus into the air flowing through the intake tract. The location is arranged for example in an intake channel assigned to the combustion chamber, wherein the intake channel is formed for example by a cylinder head of the internal combustion engine. Whereas, for example, the combustion chamber is formed by a motor housing, formed in particular as a cylinder housing, preferably as a cylinder crankcase, of the internal combustion engine, the intake channel is formed for example by the cylinder head, wherein the cylinder head and the motor housing are two housing elements, which are formed separately from one another and which are connected to one another, of the internal combustion engine. In this way, by means of the second injection valve, a so-called channel injection can be performed by means of which the gasoline, also referred to as petrol, can be injected into the intake tract, because the gasoline is injectable or injected into the intake channel by means of the second injection valve. Thus, the injection of the gasoline that can be effected by means of the second injection valve is also referred to as channel injection.

It is also conceivable that the location is arranged in an induction module, also referred to as an air module, intake pipe or intake module, wherein the induction module is for example a component, which is formed separately from the cylinder head and which is fastened to the cylinder head, of the internal combustion engine. The induction module may be formed from a plastic and/or from a metallic material. Alternatively or in addition, the cylinder head may be formed from a metallic material and/or from a plastic. The induction module is also referred to as an intake pipe, such that, for example, the gasoline can be injected into the intake tract by way of at least one so-called intake pipe injection by means of the second injection valve. The injection of the gasoline that can be effected by means of the second injection valve thus constitutes a channel or intake pipe injection.

The invention is based on the following realization: instead of injecting pure petrol or pure gasoline by means of the first injection valve, it is provided according to the invention that the mixture, for example in the form of a petrol-water emulsion, is injected by means of the first injection valve directly into the combustion chamber. In relation to the injection of pure petrol, the increased vaporization cooling of the water fraction that can be utilized by means of the injection of the mixture can reduce the combustion chamber and exhaust-gas temperatures to such an extent that an exceedance of component limit temperatures by the exhaust gas of the internal combustion engine can be reliably avoided, without the need for excessive enrichment, or any enrichment whatsoever, of the fuel-air mixture for this purpose. It is thus possible, for example, to implement lambda-1 operation of the internal combustion engine even at high loads, such that the fuel consumption and thus the $CO_2$ emissions of the internal combustion engine can be kept particularly low. The direct injection of the mixture is also referred to as direct petrol-water mixture injection (DWI), and is thus referred to as DWI concept or DWI operation. It has been found that, in the case of a pure DWI concept without the use of a gasoline intake pipe or channel injection, although the volume increase of the total injection quantity owing to the additional DWI water fraction can in part be compensated in terms of volume by the reduced fuel consumption, an increase of the injection time however remains present overall. The reduced fuel consumption arises here from an improvement, caused by cooling and inert gas, of the knocking limit, and the associated shift of the combustion center of gravity in the direction of the thermodynamically particularly advantageous or optimum center of gravity, which commonly lies at 8 degrees crank angle after ignition top dead center (ITDC).

This volume increase of the total injection quantity in the case of a pure DWI concept may not be without problems in particular in the case of a relatively great cooling requirement, firstly with regard to a wall film interaction of the mixture, which is for example injected as an emulsion spray directly into the combustion chamber, with a cylinder wall, also referred to as liner or cylinder liner, of the combustion chamber with regard to the required vaporization time of the emulsion spray, and secondly with regard to the possibilities of optimizing the mixture formation by way of multiple injection. Furthermore, despite the reduced fuel injection quantity owing to the DWI operation, the nominal load range continues to exhibit high particle loads as before.

The injection of the gasoline into the intake tract and thus at a location arranged upstream of the combustion chamber is also referred to as petrol MPI operation or petrol MPI concept, or MPI operation or MPI concept. Pure petrol MPI operation without the use of DWI can, by contrast, considerably reduce the formation of particles, but, owing to insufficient charge/mixture cooling, would exhibit considerably poorer knocking limits than pure DWI operation. Against this background, the invention proposes utilizing the MPI concept in addition to the DWI concept and thus being able to inject the mixture by means of the first injection valve directly into the combustion chamber and to inject the gasoline by means of the second injection valve into the intake tract upstream of the combustion chamber.

The first injection valve is also referred to as injector and is for example a high-pressure injector, by means of which the mixture can be injected at a high pressure directly into the combustion chamber. In particular, the mixture can be injected by means of the first injection valve at a first pressure, wherein the gasoline can be injected by means of the second injection valve at a second pressure which is lower than the first pressure. The high-pressure injector is thus also referred to as DWI high-pressure injector and is for example arranged in a DWI high-pressure injector path via which the first injection valve can be supplied with the mixture and with the high pressure. Since the second pressure is lower than the first pressure, the second injection valve is for example a low-pressure injector by means of which the gasoline can be injected into the intake tract. The low-pressure injector is for example arranged in an MPI low-pressure path via which the second injection valve can be supplied with the gasoline at the second pressure.

For example, the MPI low-pressure path, also referred to simply as low-pressure path, serves primarily for the introduction of the gasoline, which is a main operating medium for the operation of the internal combustion engine during fired operation. The use of the low-pressure path primarily for the introduction of the main operating medium makes it possible to implement a highly advantageous operating strategy in the petrol-water mixture injection. In the case of a pure DWI concept without combination with an MPI concept, a volume increase occurs, which necessitates either longer injection times or a higher steady-state throughflow value of the injector. The steady-state throughflow value is also referred to as Q-stat. The longer injection times limit in particular the high engine speed range, significant optimization possibilities for the injection strategy, in particular with regard to the implementation of multiple injection, and for the selection of the injection time, which can be manifest in adverse blow-by rates and adverse particle emissions. Higher Q-stat values, which could in turn reduce the injection times, are, by contrast, critical with regard to extremely low fuel quantities during low-load operation or during so-called catalytic converter heating, in the course of which at least one exhaust-gas aftertreatment device of the internal combustion engine is heated during a cold start or warm-up if the pressure with which the mixture is injected for example directly into the combustion chamber, also referred to as injection high pressure, is not to be reduced. Preferably, the pressure at which the mixture is introduced by means of the first injection valve directly into the combustion chamber is at least 350 bar.

In order to avoid the above-stated disadvantages and problems, provision is made according to the invention, instead of a pure DWI concept and instead of a pure MPI concept, to combine these concepts in order here, for example with increasing water rates, to gradually shift the petrol fuel quantity from the direct injection into the intake pipe or channel injection, for example as an advance or intake-synchronous injection. This means, for example, that the injection of the gasoline into the intake tract, which can be effected by means of the second injection valve, is performed as at least one or exactly one advance or intake-synchronous injection, such that, by means of the second injection valve, the gasoline is for example injected while the combustion chamber, or a piston movable in the combustion chamber, is in its induction stroke, or else the injection of the gasoline is performed by means of the second injection valve within the working cycle of the internal combustion engine prior to the induction stroke of the combustion chamber or of the piston. This makes it possible for the injection volumes of the first injection valves to be maintained or even reduced. In the extreme case, this operation can be extended as far as pure petrol suction pipe injection paired with pure DI water injection. This would even result in a significant reduction of the overall injection volumes of the first injection valve at nominal load and a significant reduction of the tendencies for particle formation within the combustion chamber, because this relatively small injection volume which is injected directly into the combustion chamber can be caused to vaporize much more easily in terms of mixing technology without the risk of excessive wall film formation. Although cooling efficiency may be slightly lost, because the petrol injection is replaced in part by intake pipe or channel petrol injection, the resulting increase in water consumption in order to maintain the combustion chamber cooling unchanged is negligible overall. A reason for this is the fact that water has an enthalpy of vaporization in relation to mass which is higher, by a factor of 6.4, than that of petrol. This means that, if in doubt, the operating medium with the highest vaporization cooling in relation to mass, or enthalpy of vaporization, is or must always be directly injected, wherein the other, second operating medium, in the present case for example the petrol, may by contrast also be introduced via the intake pipe injection.

According to the invention, therefore, a combined MPI-DWI operating strategy is provided, the further advantages of which lie in the considerably increased dynamics of the injection strategy. It is thus possible to change the injection composition and the cooling action thereof from one cycle to the next by switching for example from DWI to MPI or vice versa, whereas, in the case of pure DWI, a change in the fuel composition can be implemented only if the HP rail volume has been exchanged. This permits highly flexible handling of this concept over the entire engine speed range. This yields considerable advantages for example in the case of a gearshift-induced load dump, in particular with regard to torque reserve and low-load stability.

Furthermore, the MPI-DWI combination provided according to the invention provides the chance of a catalytic converter heating strategy which is optimized in terms of soot or particle emissions, for example by virtue of petrol MPI being implemented and an injection which is decoupled from the ignition being implemented as the DWI injection. Furthermore, an injection which is optimized in terms of soot emissions and which is decoupled from the ignition is realized in particular as the DWI injection for extending the knocking limit at the low-end torque range. Owing to the reduced DWI injection volumes, it is furthermore possible for the introduction of fuel into the engine oil, and thus the blow-by stream, to be considerably reduced. An increase in the water requirement arising from the concept according to the invention, for example in order to compensate the cooling losses resulting from the MPI, is only minor, if present at all. Owing to the DWI volume constancy, an increase in the water requirement of only approximately 1.5 percent would thus arise in the case of a water rate of 50 percent in relation to mass, in particular against the background of the assumption that 50 percent of the vaporization cooling in the intake tract is lost as cooling power by way of a wall interaction. The reason for this is the greatly increased enthalpy of vaporization of the water as already mentioned above. As already mentioned, it is however also possible for the entire petrol injection quantity in DWI operation to be performed via MPI, which even further reduces the injection times at nominal load and in fact eliminates the formation of particles via direct injection. In this way, it is possible to implement highly efficient, highly dynamic combustion chamber cooling which permits maximum freedom with regard to the injection configuration, the steady-state DI injector throughflow and blow-by minimization. Furthermore, considerably improved mixture homogenization at nominal load can be expected as a result of the introduction of the petrol via the intake pipe or channel injection. The combustion chamber internal cooling that is reduced in the case of MPI is more than overcompensated by means of a slight increase in the water injection.

It has proven particularly advantageous if the internal combustion engine is designed to perform the injection of the mixture by means of the first injection valve as a multiple injection. Particularly efficient operation, which thus exhibits low fuel consumption, can be realized in this way. The multiple injection comprises multiple chronologically successive and mutually spaced-apart injections, in the course of which in each case one predefinable quantity of the mixture is injected.

It has furthermore proven advantageous if the internal combustion engine is designed to perform the injection of the gasoline by means of the second injection valve as a multiple injection. The multiple injection of the gasoline by means of the second injection valve also comprises, for example, multiple chronologically successive and mutually spaced-apart injections of respective predefinable quantities of the gasoline, whereby operation with particularly low fuel consumption can be realized.

In order to implement particularly efficient operation and thus to be able to keep the fuel consumption of the internal combustion engine particularly low, it is provided in a further embodiment of the invention that the internal combustion engine has at least one exhaust-gas turbocharger. The exhaust-gas turbocharger has a turbine, drivable by exhaust gas from the combustion chamber, and a compressor, arranged in the intake tract and drivable by the turbine, by means of which compressor the air flowing through the intake tract can be compressed. In this way, energy contained in the exhaust gas can be utilized for compressing the air, such that particularly efficient operation can be implemented.

A second aspect of the invention relates to a method for operating an internal combustion engine for a motor vehicle. In particular, in the context of the method according to the invention, an internal combustion engine according to the invention is operated. Here, the internal combustion engine has at least one combustion chamber, designed for example as a cylinder, and an intake tract which can be flowed through at least by air and by means of which the air flowing through the intake tract is conducted into the combustion chamber. The internal combustion engine has a first tank in which there is accommodated, in particular exclusively, liquid gasoline. The internal combustion engine is operable during the fired operation thereof by means of the gasoline.

The internal combustion engine furthermore has a second tank in which, in particular exclusively, water, in particular pure water, is accommodated. Furthermore, a mixing region is provided in which, to form a mixture which has the gasoline from the first tank and the water from the second tank, the gasoline from the first tank is mixed with the water from the second tank. Furthermore, the internal combustion engine has a first injection valve which is assigned to the combustion chamber and by means of which the mixture is injected directly into the combustion chamber within at least one working cycle of the internal combustion engine. In particular, it is provided that the mixture is injected by means of the first injection valve directly into the combustion chamber within respective, chronologically successive working cycles.

According to the invention, in order to now be able to keep the fuel consumption and the pollutant emissions of the internal combustion engine, also referred to as combustion machine, particularly low, a second injection valve is provided which is assigned to the combustion chamber and which is provided in addition to the injection valve and by means of which, within the working cycle, with regard to the water and the gasoline, exclusively the gasoline from the first tank is injected, at a location arranged upstream of the combustion chamber, into the intake tract and thus into the air flowing through the intake tract. Advantages and advantageous embodiments of the first aspect of the invention are to be regarded as advantages and advantageous embodiments of the second aspect of the invention, and vice versa.

It has proven particularly advantageous if, in the context of the method according to the invention, the internal combustion engine is operated in stoichiometric operation, which is also referred to as lambda-1 operation. In the stoichiometric operation, or during the stoichiometric operation, the respective injection of the gasoline and of the water results in the formation of a gasoline-air mixture, which is stoichiometric with regard to the air and the gasoline and which has the air and the gasoline, in the combustion chamber, such that the gasoline-air mixture has a combustion air ratio, also referred to as lambda ($\lambda$), of 1. By means of the combination of DWI and MPI, this lambda-1 operation can be realized even in high load ranges, because, for example, the water can be used for component cooling purposes. This means that it is possible to omit an enrichment of the gasoline-air mixture for component protection purposes. At the same time, adequate component cooling can be realized, such that, for example, an exceedance of limit temperatures of components, for example of the turbine of the exhaust-gas turbocharger and of a close-coupled catalytic converter, can be avoided.

A further embodiment is distinguished by the fact that, by means of an electronic processing device, in particular of the internal combustion engine, a total quantity of the gasoline to be introduced into the combustion chamber within the working cycle is determined, in particular calculated. Furthermore, by means of the electronic processing device, the total quantity is divided into a first partial quantity, which is to be injected by means of the first injection valve directly into the combustion chamber, and a second partial quantity, which is to be introduced by means of the second injection valve into the intake tract at the location, wherein the first partial quantity and the second partial quantity collectively result in the total quantity, and wherein the first partial quantity is a constituent part of the mixture and is thus injected together with the water.

Furthermore, within the working cycle, the first partial quantity is injected by means of the first injection valve directly into the combustion chamber, in particular such that the mixture is injected by means of the first injection valve directly into the combustion chamber, wherein the first partial quantity is a constituent part of the mixture. Furthermore, within the working cycle, the second partial quantity is injected by means of the second injection valve into the intake tract. In general, the use of the mixture which is injected by means of the first injection valve directly into the combustion chamber may be optional, that is to say the mixture is preferably not used in all characteristic map ranges of the internal combustion engine but only at or in particular characteristic map ranges and is preferably adapted in terms of its mixing ratio in a manner specific to the load/engine speed. The mixing ratio is to be understood to mean a respective fraction of the gasoline and of the water in the mixture.

As described above, the first partial quantity and/or the second partial quantity may be injected by means of a respective multiple injection. Furthermore, it is preferably provided that the total quantity is determined, in particular calculated, in a manner dependent on a present operating point of the internal combustion engine, and thus in accordance with demand.

In a further embodiment of the invention, the injection of the mixture by means of the first injection valve is performed as a multiple injection within the working cycle. This means that, within the working cycle, at least two or more chronologically mutually spaced-apart and successive individual injections are performed by means of the first injection valve, in the course of which, in each case, the mixture or parts of the mixture or of the total quantity is or are injected directly into the combustion chamber.

Alternatively or in addition, the injection of the gasoline by means of the second injection valve is performed as a multiple injection within the working cycle. The respective multiple injection thus has, within the working cycle, multiple chronologically successive and mutually spaced-apart injections, which are also referred to as individual injections. A respective quantity of the mixture or of the gasoline is injected by means of the respective individual injection.

Finally, it has proven particularly advantageous if at least one exhaust-gas turbocharger is provided which has a turbine, which is driven by exhaust gas from the combustion chamber, and a compressor, which is arranged in the intake tract and which is driven by the turbine, whereby the air is compressed by means of the compressor. The internal combustion engine is thus preferably designed as a supercharged internal combustion engine, in particular as a supercharged gasoline engine.

Further details of the invention will emerge from the following description of a preferred exemplary embodiment with the associated drawings.

DETAILED DESCRIPTION OF THE DRAWINGS

Figure 1:
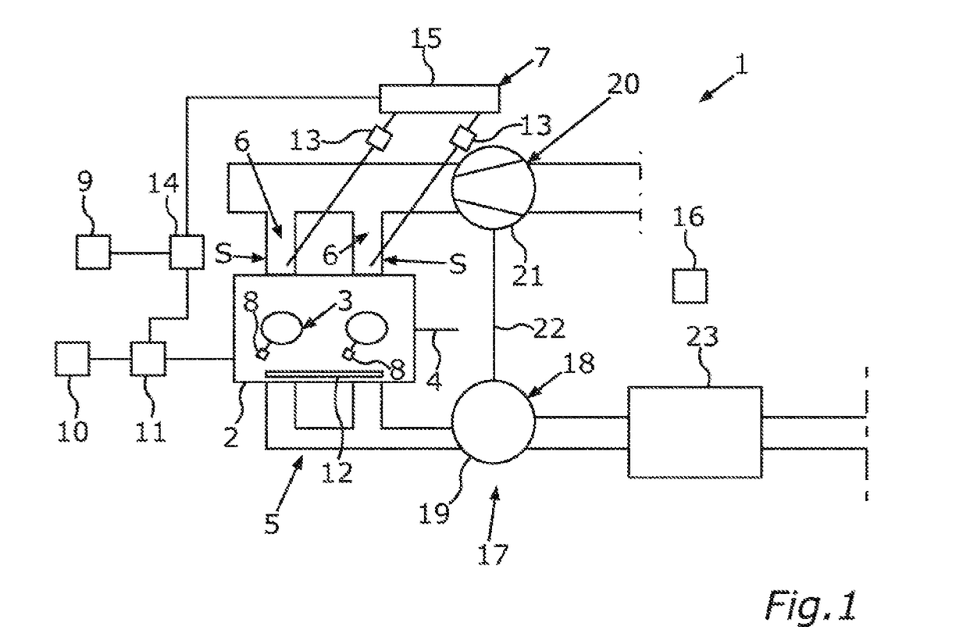
FIG. 1 is a schematic illustration of an internal combustion engine according to an embodiment of the invention.

FIG. 1 shows, in a schematic illustration, a spark-ignition internal combustion engine 1, designed preferably as a gasoline engine, for a motor vehicle, in particular for a motor car designed for example as a passenger motor car. The internal combustion engine 1 has a motor housing 2, which is designed for example as a cylinder housing, in particular as a cylinder crankcase, and by means of which multiple combustion chambers in the form of cylinders 3 of the internal combustion engine 1 are formed. Here, the internal combustion engine 1 is designed as a reciprocating-piston engine, such that a piston is accommodated in translational movable fashion in the respective cylinder 3. Here, the internal combustion engine 1 has an output shaft 4 which is designed for example as a crankshaft and which is rotatable about an axis of rotation relative to the motor housing 2. Here, the pistons are articulatedly connected to the output shaft 4 via respective connecting rods, such that the translational movements of the piston in the cylinders 3 are converted into a rotational movement of the output shaft 4.

In the context of a method for operating the internal combustion engine 1, the internal combustion engine 1 is operated in fired operation which comprises multiple chronologically successive working cycles of the internal combustion engine 1. Here, the respective working cycle encompasses exactly two complete rotations of the output shaft 4, wherein the internal combustion engine 1 is designed for example as a four-stroke engine. During the fired operation, within the respective working cycle, a gasoline-air mixture, also referred to as fuel-air mixture, is formed in the respective cylinder 3, which mixture is ignited by applied ignition and burned. As a result, an exhaust gas is generated in the respective cylinder 3, which exhaust gas can flow out of the respective cylinder 3. For this purpose, the internal combustion engine 1 comprises an exhaust tract 5 through which the exhaust gas can flow and by means of which the exhaust gas is discharged from the respective cylinder 3.

Here, the internal combustion engine 1 furthermore has an intake tract 6, which can be flowed through by air and which is also referred to as an induction tract and by means of which the air flowing through the intake tract 6 is to be conducted or is conducted into the respective cylinder 3. Furthermore, the internal combustion engine 1 has an injection system which is denoted as a whole by 7 and by means of which a liquid fuel in the form of liquid gasoline is introducible or introduced into the respective cylinder 3 for the operation of the internal combustion engine 1 in fired operation. The air flowing into the respective cylinder 3 via the intake tract 6 forms the respective abovementioned gasoline-air mixture with the gasoline introduced by means of the injection system 7 into the respective cylinder 3. Since the respective gasoline-air mixture is burned within the respective working cycle, and since the fired operation comprises multiple successive working cycles, in each case multiple combustion processes take place in the cylinders 3 during the fired operation, by means of which combustion processes the pistons, and, via these, the output shaft 4, are driven.

The internal combustion engine 1 has, for each cylinder 3, a first injection valve 8 also referred to as first injector or high-pressure injector, such that the respective injection valve 8 is assigned to exactly one respective cylinder of the cylinders 3. Furthermore, the internal combustion engine 1 has a first tank 9 for accommodating exclusively the liquid gasoline, by means of which the internal combustion engine 1 is operable during the fired operation thereof. In other words, in the context of the abovementioned method, exclusively the gasoline is accommodated in the first tank 9.

Furthermore, a second tank 10 is provided in addition to the first tank 9 and which is separate from the first tank 9, and in which exclusively water can be or is accommodated. In particular, it is for example the case that pure water is accommodated in the tank 10. Here, the first tank 9 is a tank which is common to the injection valves 8, wherein the second tank 10 is also a tank which is common to the injection valves 8 if—as will be discussed in more detail further below—the injection valves 8 are supplied both with the gasoline from the tank 9 and with the water from the tank 10.

The internal combustion engine 1 has a mixing region 11 which is illustrated in particularly highly schematic form in FIG. 1 and in which, to form a mixture which has the gasoline from the first tank 9 and the water from the second tank 10, the gasoline from the first tank 9 is to be mixed or is mixed with the water from the second tank 10. In the flow direction of the gasoline from the tank 9 in the direction of the injection valves 8 and in the flow direction of the water from the tank 10 in the direction of the injection valves 8, the mixing region 11 is arranged for example downstream of the respective tank 9 or 10 and upstream of the injection valves 8. Here, the mixing region 11 is a mixing region which is common to the injection valves 8. It is alternatively conceivable that a dedicated mixing region for mixing the gasoline from the tank 9 with the water from the tank 10 is provided for each injection valve 8, wherein, then, the respective mixing region is for example accommodated in the respective injection valve 8.

For example, by means of a conveying device which is not illustrated in FIG. 1, the gasoline from the tank 9 and the water from the tank 10 are conveyed into the mixing region 11, wherein the conveying device has for example a first pump for conveying the gasoline from the tank 9 and a second pump for conveying the water from the tank 10. From the mixing region 11, the mixture can flow for example to the injection valves 8. It can be seen from FIG. 1 that the mixture is injectable or injected by means of the respective injection valve 8 directly into the respectively associated cylinder 3.

In the exemplary embodiment illustrated in FIG. 1, a distributing element 12 is provided which is common to the injection valves 8 and which, for example, is also referred to as a rail or pipe. Here, the mixture flows for example firstly into the distributing element 12 and can be temporarily stored in the distributing element 12. By means of the distributing element 12, the mixture accommodated in the distributing element 12 is firstly distributed between the injection valves 8, such that the injection valves 8 can be supplied with the mixture by means of the distributing element 12. By means of the conveying device, the mixture can be brought to a predefinable first pressure, wherein the mixture can be stored at the first pressure in the distributing element 12. By means of the distributing element 12, the mixture which has the first pressure can be distributed to the injection valves 8, by means of which the mixture is then injected at the first pressure directly into the cylinders 3. The first pressure is for example at least 350 bar. The direct injection of the mixture is also referred to as DWI concept or DWI operation and effected, that is to say performed, by means of the injection valves 8.

In order to now be able to implement operation of the internal combustion engine 1 with low fuel consumption and low pollutant emissions, the respective cylinder 3 is assigned a second injection valve 13 which is provided in addition to the respective injection valve 8 and by means of which, with regard to the water and the gasoline, exclusively the gasoline, also referred to as petrol, from the first tank 9 is injectable or injected, at a respective location S, into the intake tract 6 and thus into the air flowing through the intake tract 6. It can be seen from FIG. 1 that the respective location S is arranged upstream of the cylinder 3 in the flow direction of the air flowing through the intake tract 6, such that the respective injection of the gasoline at the respective location S, which can be or is effected by means of the respective second injection valve 13, is an intake pipe or channel injection. By contrast, the respective injection of the mixture, which can be or is effected by means of the respective first injection valve 8, is a direct injection. The injection of the gasoline at the respective location S, which is or can be effected by means of the respective injection valve 13, is also referred to as MPI operation or as MPI concept.

For example with regard to the water accommodated in the tank 10 and with regard to the gasoline accommodated in the tank 9, exclusively the gasoline accommodated in the tank 9 is conveyed by means of the conveying device from the tank 9 to the injection valves 13, such that exclusively the gasoline is injected by means of the injection valves 13 into the intake tract 6. In order to be able, for example, to supply the gasoline from the tank 9 both to the injection valves 8 and to the injection valves 13, a valve device 14 is provided. By means of the conveying device, in particular by means of the second pump, it is for example the case that a total stream of the gasoline is conveyed from the tank 9 firstly to the valve device 14. By means of the valve device 14, the total stream is divided for example into a first partial stream and a second partial stream, wherein the first partial stream flows for example to the injection valves 13 and the second partial stream flows to and in particular into the mixing region 11. The second partial stream can then be mixed with the water from the tank 10, whereby the above-described mixture is formed.

In particular, a second pressure of the gasoline is effected by means of the conveying device, wherein the gasoline is injected at the second pressure by means of the injection valves 13 into the intake tract 6. Here, the internal combustion engine 1 comprises a further distributing element 15 which is common to the injection valves 13 and which is referred to for example as a rail or pipe. The gasoline flows for example from the valve device 14 to and in particular into the distributing element 15 and can be stored at the second pressure in the distributing element 15. The injection valves 13 are supplied with the gasoline at the second pressure by means of the distributing element 15, such that the injection valves 13 inject the gasoline at the second pressure into the intake tract 6. Here, the second pressure is significantly lower than the first pressure, such that the respective injection valve 13 is for example also referred to as low-pressure injector. It can furthermore be seen that the injection valves 8, the injection valves 13 and the distributing elements 12 and 15 are constituent parts of the injection system 7, because the gasoline and the water can be correspondingly injected by means of the stated constituent parts.

Figure 2:
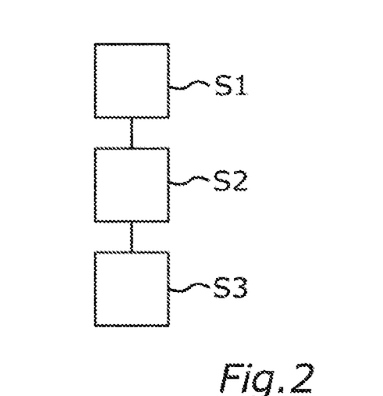
FIG. 2 is a flow diagram for illustrating a method according to an embodiment of the invention.

FIG. 2 shows a flow diagram for illustrating the above-mentioned method for operating the internal combustion engine 1. In a first step S1 of the method, a total quantity of the gasoline that is to be introduced into the respective cylinder 3 within the respective working cycle is determined, in particular calculated, for example, by means of an electronic processing device 16, which is illustrated in particularly highly schematic form in FIG. 1, of the internal combustion engine 1. In a second step S2 of the method, the total quantity is divided by means of the electronic processing device 16, which is also referred to as a control unit, into a first partial quantity, which is to be injected by means of the respective first injection valve 8 directly into the respective cylinder 3, and a second partial quantity, which is to be injected by means of the respective second injection valve 13 into the intake tract 6 at the respective location S, wherein the first partial quantity and the second partial quantity collectively result in the total quantity.

In a third step S3 of the method, within the respective working cycle, the first partial quantity is injected by means of the respective first injection valve 8 directly into the respective cylinder 3. Here, the respective first partial quantity is a constituent part of the respective mixture which is injected by means of the respective injection valve 8 directly into the respective cylinder 3. Furthermore, in the third step S3, the respective second partial quantity is injected by means of the respective second injection valve 13 into the intake tract 6.

The injection of the mixture and/or the injection of the gasoline can be performed as a multiple injection which has multiple chronologically successive and mutually spaced-apart individual injections within the respective working cycle. During the respective individual injection, a respective individual quantity of the mixture or of the gasoline is correspondingly injected by means of the respective injection valve 8 or 13.

In particular, in the context of the method, it is provided that the internal combustion engine 1 is operated in lambda-1 operation. This means that, by means of the injection of the mixture which is or can be effected by means of the respective injection valve 8, and by means of the respective injection of the gasoline which is or can be effected by means of the respective injection valve 13, the respective gasoline-air mixture is formed in the respective cylinder 3 as a stoichiometric fuel-air mixture, such that the combustion air ratio, also referred to as lambda ($\lambda$), during the fired operation amounts to 1. In this way, it is possible to avoid an enrichment for the purposes of component cooling, such that the fuel consumption can be kept at a particularly low level, in particular even at high loads of the internal combustion engine 1.

As can be seen from FIG. 1, the internal combustion engine 1 has at least one exhaust-gas turbocharger 17 which has a turbine 18 arranged in the exhaust tract 5. The turbine 18 has a turbine wheel 19 which is drivable by the exhaust gas flowing through the exhaust tract 5. Furthermore, the exhaust-gas turbocharger 17 comprises a compressor 20 which is arranged in the intake tract 6 and which has a compressor wheel 21 for compressing the air flowing through the intake tract 6. The exhaust-gas turbocharger 17 furthermore comprises a shaft 22 which is connected rotationally conjointly both to the turbine wheel 19 and to the compressor wheel 21. In this way, the compressor wheel 21 can be driven by the turbine wheel 19 via the shaft 22. In other words, if the turbine wheel 19 is driven by the exhaust gas flowing through the exhaust tract 5, then the compressor wheel 21 is consequently driven by the turbine wheel 19 via the shaft 22, whereby the air flowing through the intake tract 6 is compressed. In this way, energy contained in the exhaust gas is utilized for compressing the air, such that it is possible to realize operation with particularly low fuel consumption. Alternatively or in addition, the internal combustion engine 1 could have at least one electric compressor for supplying compressed air to the respective cylinder 3, or the internal combustion engine 1 is designed as a naturally aspirated engine.

Furthermore, in the exhaust tract 5, there is arranged at least one exhaust-gas aftertreatment device 23 which is arranged downstream of the turbine 18 in the flow direction of the exhaust gas flowing through the exhaust tract 5. The exhaust-gas aftertreatment device 23 comprises at least one exhaust-gas aftertreatment element, which may be designed for example as a catalytic converter, in particular as a 3-way catalytic converter. Alternatively or in addition, it is conceivable for an exhaust-gas aftertreatment device to be arranged in the exhaust tract 5 upstream of the turbine 18, wherein this constitutes a close-coupled exhaust-gas aftertreatment device. By means of the combination of DWI operation with MPI operation as shown in FIG. 1 and described above, it is possible to avoid excessively high temperatures of the exhaust-gas aftertreatment device 23 and of the turbine 18 without additional fuel being injected for the purposes of component cooling. In other words, the exceedance of component limit temperatures can be avoided even during the above-described lambda-1 operation, such that the fuel consumption and thus the $CO_2$ emissions of the internal combustion engine 1 can be kept particularly low.

LIST OF REFERENCE DESIGNATIONS

1 Internal combustion engine
2 Motor housing
3 Cylinder
4 Output shaft
5 Exhaust tract
6 Intake tract
7 Injection system
8 First injection valve
9 First tank
10 Second tank
11 Mixing region
12 Distributing element
13 Second injection valve
14 Valve device
15 Distributing element
16 Electronic processing device
17 Exhaust-gas turbocharger
18 Turbine
19 Turbine wheel
20 Compressor
21 Compressor wheel
22 Shaft
23 Exhaust gas aftertreatment device
S Location
S1 First step
S2 Second step
S3 Third step

What is claimed is:

1. An internal combustion engine for a motor vehicle, comprising:
    at least one combustion chamber having an inlet tract through which flows air and by which the air flowing through the inlet tract is to be conducted into the combustion chamber;
    a first tank for accommodating liquid gasoline by which the internal combustion engine is operable during fired operation thereof;
    a second tank for accommodating water;
    a mixing region in which, to form a mixture which has the gasoline from the first tank and the water from the second tank, the gasoline from the first tank is to be mixed with the water from the second tank;
    an injection valve which is assigned to the combustion chamber and by which the mixture is injectable directly into the combustion chamber;
    a second injection valve which is assigned to the combustion chamber and which is provided in addition to the injection valve, and by which, with regard to the water and the gasoline, exclusively the gasoline from the first tank is injectable at a location arranged upstream of the combustion chamber into the inlet tract and thus into the air flowing through the inlet tract;
    a control unit configured to determine
        a total gasoline quantity to be delivered from the first tank to the engine;
        a first fuel partial quantity of the total gasoline quantity to be delivered to the injection valve assigned to the combustion chamber which delivers the mixture of gasoline and water, and
        a second fuel partial quantity of the total gasoline quantity to be delivered to the second injection valve assigned to the combustion chamber which delivers exclusively gasoline; and
    a flow dividing valve configured to
        receive from the first tank the total gasoline quantity and divide the total gasoline quantity into the first partial fuel quantity and the second fuel partial quantity to the second injection valve,
        output the first fuel partial quantity to the injection valve via a mixing region at which water is mixed with the first fuel partial quantity, and
        output the second partial fuel quantity to the second injection valve.

2. The internal combustion engine according to claim 1, wherein
    the internal combustion engine is configured to perform the injection of the mixture by the injection valve as a multiple injection.

3. The internal combustion engine according to claim 2, wherein
    the internal combustion engine is configured to perform the injection of the gasoline by the second injection valve as a multiple injection.

4. The internal combustion engine according to claim 1, further comprising:
    at least one exhaust-gas turbocharger which has a turbine, driveable by exhaust gas from the combustion chamber, and a compressor, arranged in the inlet tract and driveable by the turbine, whereby air is compressed.

5. The internal combustion engine according to claim 1, wherein
    the internal combustion engine is configured to perform the injection of the gasoline by the second injection valve as a multiple injection.

6. A method for operating an internal combustion engine for a motor vehicle, the engine having
    at least one combustion chamber,
    an inlet tract which is flowed through at least by air and by which the air flowing through the inlet tract is conducted into the combustion chamber,
    a first tank in which liquid gasoline is stored by which the internal combustion engine is operable during fired operation thereof,
    a second tank in which water is stored,
    a mixing region in which, to form a mixture which has the gasoline from the first tank and the water from the second tank, the gasoline from the first tank is mixed with the water from the second tank,
    an injection valve by which the mixture is injectable directly into the combustion chamber,
    a second injection valve in addition to the injection valve by which exclusively the gasoline from the first tank is injectable at a location arranged upstream of the combustion chamber into the inlet tract and thus into the air flowing through the inlet tract,
    a control unit and
    a flow dividing valve,
    the method comprising the acts of:
    determining a total gasoline quantity to be delivered from the first tank to the engine, a first fuel partial quantity of the total gasoline quantity to be delivered to the injection valve assigned to the combustion chamber which delivers the mixture of gasoline and water, and a second fuel partial quantity of the total gasoline quantity to be delivered to the second injection valve assigned to the combustion chamber which delivers exclusively gasoline;

injecting the second fuel partial quantity mixture of gasoline and water via the injection valve directly into the combustion chamber within at least one working cycle of the internal combustion engine; and injecting second fuel partial quantity via the second injection valve into the inlet tract and thus into the air flowing through the inlet tract.

7. The method according to claim 6, wherein the internal combustion engine is operated in stoichiometric operation in which, as a result of the respective injection of the gasoline and of the water, a gasoline-air mixture which has the air and the gasoline and which is stoichiometric with regard to the air and the gasoline is formed in the combustion chamber.

8. The method according to claim 6, wherein the injection of the mixture by the injection valve is performed as a multiple injection within the working cycle.

9. The method according to claim 8, wherein the injection of the gasoline by the second injection valve is performed as a multiple injection within the working cycle.

10. The method according to claim 6, wherein at least one exhaust-gas turbocharger is provided which has a turbine, which is driven by exhaust gas from the combustion chamber, and a compressor, which is arranged in the inlet tract and which is driven by the turbine, whereby the air is compressed by the compressor.

* * * * *